US006810659B1

(12) United States Patent
Bidner et al.

(10) Patent No.: US 6,810,659 B1
(45) Date of Patent: Nov. 2, 2004

(54) METHOD FOR DETERMINING EMISSION CONTROL SYSTEM OPERABILITY

(75) Inventors: David Karl Bidner, Livonia, MI (US); Gopichandra Surnilla, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 38 days.

(21) Appl. No.: 09/528,220

(22) Filed: Mar. 17, 2000

(51) Int. Cl.$^7$ .................................................. F01N 3/00
(52) U.S. Cl. .............................. 60/277; 60/274; 60/276; 204/424
(58) Field of Search .......................... 60/274, 276, 277, 60/285, 301; 73/23.31, 23.32, 118.1; 204/424, 425, 426, 401; 205/781; 123/479, 688, 690, 691

(56) References Cited

U.S. PATENT DOCUMENTS

| 3,696,618 A | 10/1972 | Boyd et al. |
| 3,969,932 A | 7/1976 | Rieger et al. |

(List continued on next page.)

FOREIGN PATENT DOCUMENTS

| DE | 196 07 151 C1 | 7/1997 |
| EP | 0 351 197 A2 | 1/1990 |
| EP | 0 444 783 A1 | 9/1991 |
| EP | 0 503 882 A1 | 9/1992 |
| EP | 0 580 389 A1 | 1/1994 |
| EP | 0859232 | * 8/1998 |
| JP | 62-97630 | 5/1987 |
| JP | 62-117620 | 5/1987 |
| JP | 64-53042 | 3/1989 |
| JP | 2-30915 | 2/1990 |
| JP | 2-33408 | 2/1990 |
| JP | 2-207159 | 8/1990 |
| JP | 3-135417 | 6/1991 |
| JP | 5-26080 | 2/1993 |
| JP | 5-106493 | 4/1993 |
| JP | 5-106494 | 4/1993 |
| JP | 6-58139 | 3/1994 |
| JP | 6-264787 | 9/1994 |
| JP | 7-97941 | 4/1995 |
| JP | 7-166851 | 6/1995 |
| WO | WO 98/27322 | 6/1998 |

OTHER PUBLICATIONS

"An Air/Fuel Algorithm To Improve The NOx Conversion Of Copper–Based Catalysts", by Joe Theis et al, SAE Technical Paper No. 922251, Oct. 19–22, 1992, pp. 77–89.
"Effect of Air–Fuel Ratio Modulation on Conversion Efficiency of Three–Way Catalysts", By Y. Kaneko et al., Inter–Industry Emission Control Program 2 (IIEC–2) Progress Report No. 4, SAE Technical Paper No. 780607, Jun. 5–9, 1978, pp. 119–127.
"Engineered Control Strategies For Improved Catalytic Control of NOx in Lean Burn Applications", by Alan F. Diwell, SAE Technical Paper No. 881595, 1988, pp. 1–11.
W.H. Holl, "Air Fuel Control to Reduce Emissions I. Engine–Emissions Relationships", SAE 800051, Feb. 25–29, 1980.
Wei–Ming Wang, "Air–Fuel Control to Reduce Emissions, II. Engine–Catalyst Characterization Under Cyclic Conditions", SAE 800052, Feb. 25–29, 1980.

*Primary Examiner*—Thomas Denion
*Assistant Examiner*—Tu M. Nguyen
(74) *Attorney, Agent, or Firm*—Allen J. Lippa

(57) ABSTRACT

An engine diagnostic system for use with an internal combustion engine coupled to a lean NOx trap with a sensor coupled downstream of the trap. The sensor provides two output signals, one indicative of an air-fuel ratio and the second indicative of a NOx concentration. Construction of the sensor insists that proper indication of NOx concentration is dependent upon proper operation of the first output signal. Degradation of the NOx concentration signal is determined when the first output signal has degraded.

19 Claims, 12 Drawing Sheets

U.S. PATENT DOCUMENTS

| | | | |
|---|---|---|---|
| 4,033,122 A | | 7/1977 | Masaki et al. |
| 4,036,014 A | | 7/1977 | Ariga |
| 4,178,883 A | | 12/1979 | Herth |
| 4,251,989 A | | 2/1981 | Norimatsu et al. |
| 4,622,809 A | | 11/1986 | Abthoff et al. |
| 4,854,123 A | | 8/1989 | Inoue et al. |
| 4,884,066 A | | 11/1989 | Miyata et al. |
| 4,887,576 A | * | 12/1989 | Inamoto et al. ............. 123/479 |
| 4,913,122 A | | 4/1990 | Uchida et al. |
| 4,915,080 A | * | 4/1990 | Nakaniwa et al. .......... 123/691 |
| 5,009,210 A | | 4/1991 | Nakagawa et al. |
| 5,020,499 A | * | 6/1991 | Kojima et al. ............... 204/401 |
| 5,088,281 A | | 2/1992 | Izutani et al. |
| 5,097,700 A | | 3/1992 | Nakane |
| 5,165,230 A | | 11/1992 | Kayanuma et al. |
| 5,174,111 A | | 12/1992 | Nomura et al. |
| 5,189,876 A | | 3/1993 | Hirota et al. |
| 5,201,802 A | | 4/1993 | Hirota et al. |
| 5,209,061 A | | 5/1993 | Takeshima |
| 5,222,471 A | | 6/1993 | Stueven |
| 5,233,830 A | | 8/1993 | Takeshima et al. |
| 5,267,439 A | | 12/1993 | Raff et al. |
| 5,270,024 A | | 12/1993 | Kasahara et al. |
| 5,272,871 A | | 12/1993 | Oshima et al. |
| 5,325,664 A | | 7/1994 | Seki et al. |
| 5,331,808 A | * | 7/1994 | Koike ......................... 60/276 |
| 5,331,809 A | | 7/1994 | Takeshima et al. |
| 5,335,538 A | | 8/1994 | Blischke et al. |
| 5,357,750 A | | 10/1994 | Ito et al. |
| 5,377,484 A | | 1/1995 | Shimizu |
| 5,402,641 A | | 4/1995 | Katoh et al. |
| 5,410,873 A | | 5/1995 | Tashiro |
| 5,412,945 A | | 5/1995 | Katoh et al. |
| 5,412,946 A | | 5/1995 | Oshima et al. |
| 5,414,994 A | | 5/1995 | Cullen et al. |
| 5,419,122 A | | 5/1995 | Tabe et al. |
| 5,423,181 A | | 6/1995 | Katoh et al. |
| 5,426,934 A | * | 6/1995 | Hunt et al. .................... 60/277 |
| 5,433,074 A | | 7/1995 | Seto et al. |
| 5,437,153 A | | 8/1995 | Takeshima et al. |
| 5,444,977 A | * | 8/1995 | Kawabata .................... 60/276 |
| 5,448,887 A | | 9/1995 | Takeshima |
| 5,450,722 A | | 9/1995 | Takeshima et al. |
| 5,452,576 A | | 9/1995 | Hamburg et al. |
| 5,472,673 A | | 12/1995 | Goto et al. |
| 5,473,887 A | | 12/1995 | Takeshima et al. |
| 5,473,890 A | | 12/1995 | Takeshima et al. |
| 5,483,795 A | | 1/1996 | Katoh et al. |
| 5,544,482 A | | 8/1996 | Matsumoto et al. |
| 5,551,231 A | | 9/1996 | Tanaka et al. |
| 5,577,382 A | | 11/1996 | Kihara et al. |
| 5,595,060 A | | 1/1997 | Togai et al. |
| 5,598,703 A | | 2/1997 | Hamburg et al. |
| 5,622,047 A | | 4/1997 | Yamashita et al. |
| 5,626,014 A | | 5/1997 | Hepburn et al. |
| 5,626,117 A | | 5/1997 | Wright et al. |
| 5,655,363 A | | 8/1997 | Ito et al. |
| 5,657,625 A | | 8/1997 | Koga et al. |
| 5,693,877 A | | 12/1997 | Ohsuga et al. |
| 5,713,199 A | | 2/1998 | Takeshima et al. |
| 5,715,679 A | | 2/1998 | Asanuma et al. |
| 5,722,236 A | | 3/1998 | Cullen et al. |
| 5,724,808 A | | 3/1998 | Ito et al. |
| 5,732,554 A | | 3/1998 | Sasaki et al. |
| 5,735,119 A | | 4/1998 | Asanuma et al. |
| 5,740,669 A | | 4/1998 | Kinugasa et al. |
| 5,743,084 A | | 4/1998 | Hepburn |
| 5,746,049 A | | 5/1998 | Cullen et al. |
| 5,746,052 A | | 5/1998 | Kinugasa et al. |
| 5,752,492 A | | 5/1998 | Kato et al. |
| 5,771,685 A | | 6/1998 | Hepburn |
| 5,771,686 A | | 6/1998 | Pischinger et al. |
| 5,778,666 A | | 7/1998 | Cullen et al. |
| 5,792,436 A | | 8/1998 | Feeley et al. |
| 5,802,843 A | | 9/1998 | Kurihara et al. |
| 5,803,048 A | | 9/1998 | Yano et al. |
| 5,832,722 A | | 11/1998 | Cullen et al. |
| 5,842,339 A | * | 12/1998 | Bush et al. ................... 60/274 |
| 5,842,340 A | | 12/1998 | Bush et al. |
| 5,865,027 A | | 2/1999 | Hanafusa et al. |
| 5,938,715 A | | 8/1999 | Zhang et al. |
| 5,953,907 A | * | 9/1999 | Kato et al. ................... 60/274 |
| 5,970,707 A | | 10/1999 | Sawada et al. |
| 5,974,788 A | | 11/1999 | Hepburn et al. |
| 5,974,791 A | | 11/1999 | Hirota et al. |
| 5,974,793 A | | 11/1999 | Kinugasa et al. |
| 5,983,627 A | | 11/1999 | Asik |
| 5,992,142 A | | 11/1999 | Pott |
| 5,996,338 A | | 12/1999 | Hirota |
| 6,012,282 A | * | 1/2000 | Kato et al. ................... 60/274 |
| 6,012,428 A | | 1/2000 | Yano et al. |
| 6,014,859 A | | 1/2000 | Yoshizaki et al. |
| 6,023,929 A | | 2/2000 | Ma |
| 6,026,640 A | * | 2/2000 | Kato et al. ................... 60/277 |
| 6,058,700 A | | 5/2000 | Yamashita et al. |
| 6,059,947 A | * | 5/2000 | Kato et al. .................. 204/425 |
| 6,082,176 A | * | 7/2000 | Kondo et al. ............... 73/23.31 |
| 6,120,663 A | * | 9/2000 | Kato et al. ................... 204/401 |
| 6,148,612 A | * | 11/2000 | Yamashita et al. ............ 60/277 |
| 6,167,695 B1 | * | 1/2001 | Itou et al. ..................... 60/274 |
| 6,214,207 B1 | * | 4/2001 | Miyata et al. .............. 205/781 |
| 6,311,480 B1 | | 11/2001 | Suzuki et al. |

* cited by examiner

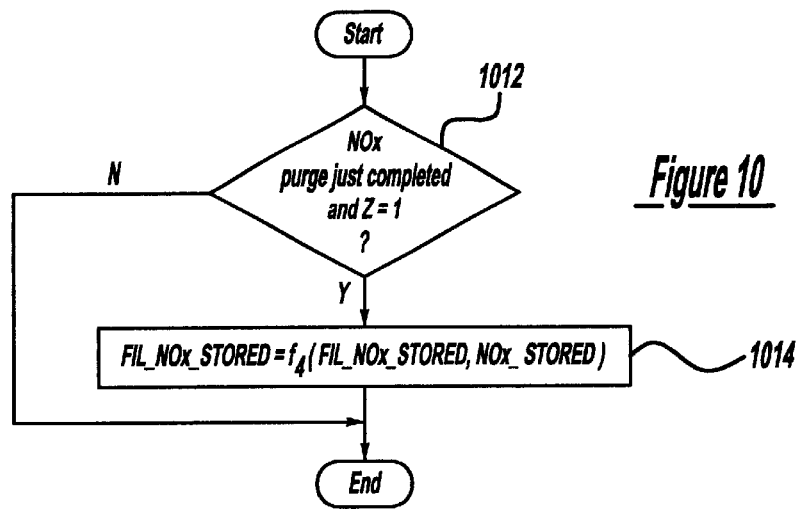
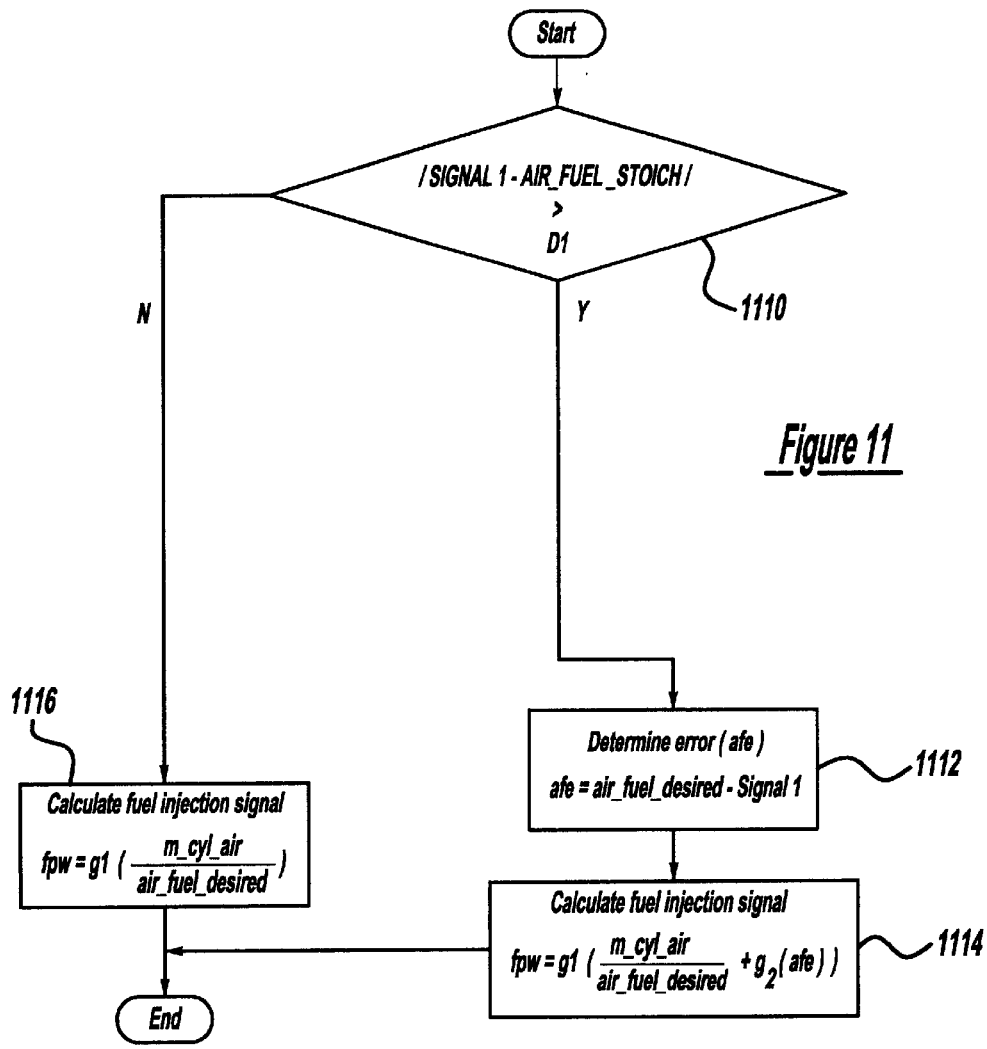

METHOD FOR DETERMINING EMISSION CONTROL SYSTEM OPERABILITY

FIELD OF THE INVENTION

The invention relates to a system and method for determining degradation in an emission control system.

BACKGROUND OF THE INVENTION

Engine and vehicle fuel efficiency can be improved by lean burn internal combustion engines. To reduce emissions, these lean burn engines are coupled to emission control devices known as three-way catalytic converters optimized to reduce CO, HC, and NOx. When operating at air-fuel ratio mixtures lean of stoichiometry, additional three-way catalyst, sometimes referred to as a NOx trap or catalyst, is typically coupled downstream of the three-way catalytic converter, where the NOx trap is optimized to further reduce NOx. The NOx trap typically stores NOx when the engine operates lean and release NOx to be reduced when the engine operates rich or near stoichiometry.

One method to provide emission control in a lean burn engine uses a sensor downstream of the NOx trap. The sensor is capable of measuring an amount of NOx in exhaust gas exiting the NOx trap. Engine air-fuel ratio is changed from lean of stoichiometry to rich of stoichiometry when measured NOx reaches a predetermined threshold. Such a method is described in U.S. Pat. No. 5,942,199.

In particular, the sensor described in U.S. Pat. No. 5,942,199 is capable of measuring both NOx and oxygen partial pressure in exhaust gas. The sensor has a first chamber where exhaust gas first enters and where a measurement of oxygen partial pressure is generated from a first pumping current. Also, in the first chamber, oxygen partial pressure of the exhaust gas is controlled to a predetermined level. Next, the exhaust gas enters a second chamber where NOx is decomposed and measured by a second pumping current, knowing the predetermined level.

The inventors herein have recognized a disadvantage with the above approach. In particular, if the output of the NOx sensor inadvertently indicates a NOx concentration greater than the predetermined threshold when NOx concentration is actually less that the threshold, lean operation will be ended prematurely. In other words, lean operation will be ended when it is actually possible to continue lean operation.

SUMMARY OF THE INVENTION

An object of the invention claimed herein is to provide a system and method for determining degradation in an emission control system.
The above object is achieved, and disadvantages of prior approaches overcome, by a method for determining degradation in an emission control system coupled to an internal combustion engine comprising: providing first and second signals from a sensor coupled downstream of the engine, said first output signal and said second output signal respectively indicative of a first exhaust gas constituent flowing through the emission control system and a second exhaust gas constituent flowing through the emission control system; and determining degradation of said second output signal based on said first output signal.

Since a single sensor mutually supplies two signals, it is possible to determine when one signal-has degraded based on the other signal. For example, in one aspect of the invention, the sensor supplies indications of both oxygen partial pressure and nitrogen oxide. In this example, exhaust gases must first be affected to provide an indication of oxygen partial pressure. Then, the affected exhaust gases are used to provide an indication of nitrogen oxide. By observing the first output, oxygen partial pressure, it is possible to determine whether the second output, nitrogen oxide, is degraded. In other words, if the first output is degraded, the second output will also be degraded. This is because the functioning of the second output relies on operability of the first output.

An advantage of the above aspect of the present invention is improved control since it is possible to determine operability of sensors.

Other objects, features and advantages of the present invention will be readily appreciated by the reader of this specification.

BRIEF DESCRIPTION OF THE DRAWINGS

The objects and advantages described herein will be more fully understood by reading an example of an embodiment in which the invention is used to advantage, referred to herein as the Description of Preferred Embodiment, with reference to the drawings, wherein:

FIGS. 3–15 are high level flow charts of various operations performed by a portion of the embodiment shown in FIG. 1.

DESCRIPTION OF THE INVENTION

Figure 1:
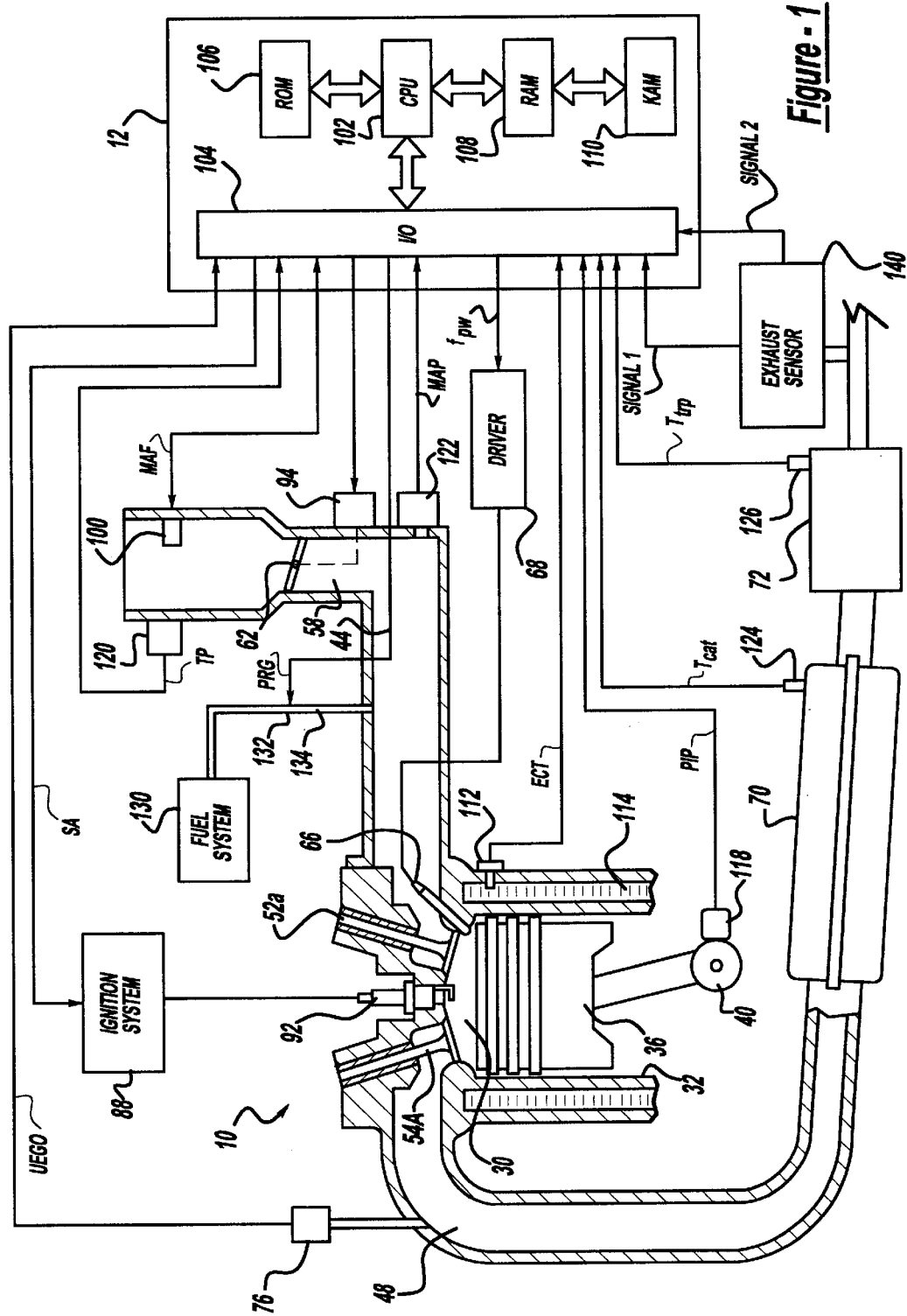
FIGS. 1–2 are block diagrams of an embodiment wherein the invention is used to advantage.

Direct injection spark ignited internal combustion engine 10, comprising a plurality of combustion chambers, is controlled by electronic engine controller 12 as shown in FIG. 1. Combustion chamber 30 of engine 10 includes combustion chamber walls 32 with piston 36 positioned therein and connected to crankshaft 40. In this particular example, piston 36 includes a recess or bowl (not shown) to help in forming stratified charges of air and fuel. Combustion chamber 30 is shown communicating with intake manifold 44 and exhaust manifold 48 via respective intake valves 52a and 52b (not shown), and exhaust valves 54a and 54b (not shown). Fuel injector 66 is shown directly coupled to combustion chamber 30 for delivering liquid fuel directly therein in proportion to the pulse width of signal fpw received from controller 12 via conventional electronic driver 68. Fuel is delivered to fuel injector 66 by a conventional high pressure fuel system (not shown) including a fuel tank, fuel pumps, and a fuel rail.

Intake manifold 44 is shown communicating with throttle body 58 via throttle plate 62. In this particular example, throttle plate 62 is coupled to electric motor 94 so that the position of throttle plate 62 is controlled by controller 12 via electric motor 94. This configuration is commonly referred to as electronic throttle control (ETC) which is also utilized during idle speed control. In an alternative embodiment (not shown), which is well known to those skilled in the art, a bypass air passageway is arranged in parallel with throttle plate 62 to control inducted airflow during idle speed control via a throttle control valve positioned within the air passageway.

Exhaust gas oxygen sensor 76 is shown coupled to exhaust manifold 48 upstream of catalytic converter 70. In this particular example, sensor 76 provides signal UEGO to controller 12 which converts signal UEGO into a relative air-fuel ratio λ. Signal UEGO is used to advantage during feedback air-fuel ratio control in a manner to maintain average air-fuel ratio at a desired air-fuel ratio as described later herein. In an alternative embodiment, sensor 76 can provide signal EGO (not show) which indicates whether exhaust air-fuel ratio is either lean of stoichiometry or rich of stoichiometry.

Conventional distributorless ignition system 88 provides ignition spark to combustion chamber 30 via spark plug 92 in response to spark advance signal SA from controller 12.

Controller 12 causes combustion chamber 30 to operate in either a homogeneous air-fuel ratio mode or a stratified air-fuel ratio mode by controlling injection timing. In the stratified mode, controller 12 activates fuel injector 66 during the engine compression stroke so that fuel is sprayed directly into the bowl of piston 36. Stratified air-fuel ratio layers are thereby formed. The strata closest to the spark plug contains a stoichiometric mixture or a mixture slightly rich of stoichiometry, and subsequent strata contain progressively leaner mixtures. During the homogeneous mode, controller 12 activates fuel injector 66 during the intake stroke so that a substantially homogeneous air-fuel ratio mixture is formed when ignition power is supplied to spark plug 92 by ignition system 88. Controller 12 controls the amount of fuel delivered by fuel injector 66 so that the homogeneous air-fuel ratio mixture in chamber 30 can be selected to be substantially at (or near) stoichiometry, a value rich of stoichiometry, or a value lean of stoichiometry. Operation substantially at (or near) stoichiometry refers to conventional closed loop oscillatory control about stoichiometry. The stratified air-fuel ratio mixture will always be at a value lean of stoichiometry, the exact air-fuel ratio being a function of the amount of fuel delivered to combustion chamber 30. An additional split mode of operation wherein additional fuel is injected during the exhaust stroke while operating in the stratified mode is available. An additional split mode of operation wherein additional fuel is injected during the intake stroke while operating in the stratified mode is also available, where a combined homogeneous and split mode is available.

Nitrogen oxide (NOx) absorbent or trap 72 is shown positioned downstream of catalytic converter 70. NOx trap 72 absorbs NOx when engine 10 is operating lean of stoichiometry. The absorbed NOx is subsequently reacted with HC and catalyzed during a NOx purge cycle when controller 12 causes engine 10 to operate in either a rich mode or a near stoichiometric mode.

Controller 12 is shown in FIG. 1 as a conventional microcomputer including: microprocessor unit 102, input/output ports 104, an electronic storage medium for executable programs and calibration values, shown as read-only memory chip 106 in this particular example, random access memory 108, keep alive memory 110, and a conventional data bus.

Controller 12 is shown receiving various signals from sensors coupled to engine 10, in addition to those signals previously discussed, including: measurement of inducted mass air flow (MAF) from mass air flow sensor 100 coupled to throttle body 58; engine coolant temperature (ECT) from temperature sensor 112 coupled to cooling sleeve 114; a profile ignition pickup signal (PIP) from Hall effect sensor 118 coupled to crankshaft 40 giving an indication of engine speed (RPM); throttle position TP from throttle position sensor 120; and absolute Manifold Pressure Signal MAP from sensor 122. Engine speed signal RPM is generated by controller 12 from signal PIP in a conventional manner and manifold pressure signal MAP provides an indication of engine load.

In this particular example, temperature Tcat of catalytic converter 70 and temperature Ttrp of NOx trap 72 are inferred from engine operation as disclosed in U.S. Pat. No. 5,414,994, the specification of which is incorporated herein by reference. In an alternate embodiment, temperature Tcat is provided by temperature sensor 124 and temperature Ttrp is provided by temperature sensor 126.

Fuel system 130 is coupled to intake manifold 44 via tube 132. Fuel vapors (not shown) generated in fuel system 130 pass through tube 132 and are controlled via purge valve 134. Purge valve 134 receives control signal PRG from controller 12.

Exhaust sensor 140 is a sensor that produces two output signals. First output signal (SIGNAL1) and second output signal (SIGNAL2) are both received by controller 12. Exhaust sensor 140 can be a sensor known to those skilled in the art that is capable of indicating both exhaust air-fuel ratio and nitrogen oxide concentration.

In a preferred embodiment, SIGNAL1 indicates exhaust air-fuel ratio and SIGNAL2 indicates nitrogen oxide concentration. In this embodiment, sensor 140 has a first chamber (not shown) in which exhaust gas first enters where a measurement of oxygen partial pressure is generated from a first pumping current. Also, in the first chamber, oxygen partial pressure of the exhaust gas is controlled to a predetermined level. Exhaust air-fuel ratio can then be indicated based on this first pumping current. Next, the exhaust gas enters a second chamber (not shown) where NOx is decomposed and measured by a second pumping current using the predetermined level. Nitrogen oxide concentration can then be indicated based on this second pumping current.

In one aspect of the present invention, a determination of degradation of the nitrogen oxide concentration measurement can be made if it is determined that the exhaust air-fuel ratio measurement is degraded. This is because nitrogen oxide concentration is not accurately detected in the second chamber unless the first chamber controls oxygen partial pressure properly. In other words, if it is determined that operation of the first chamber (where partial pressure of oxygen is measured) is degraded, then it is possible to determine that the second signal (SIGNAL2) indicating nitrogen oxide concentration is degraded as described later herein with particular reference to FIG. 13.

Figure 2:
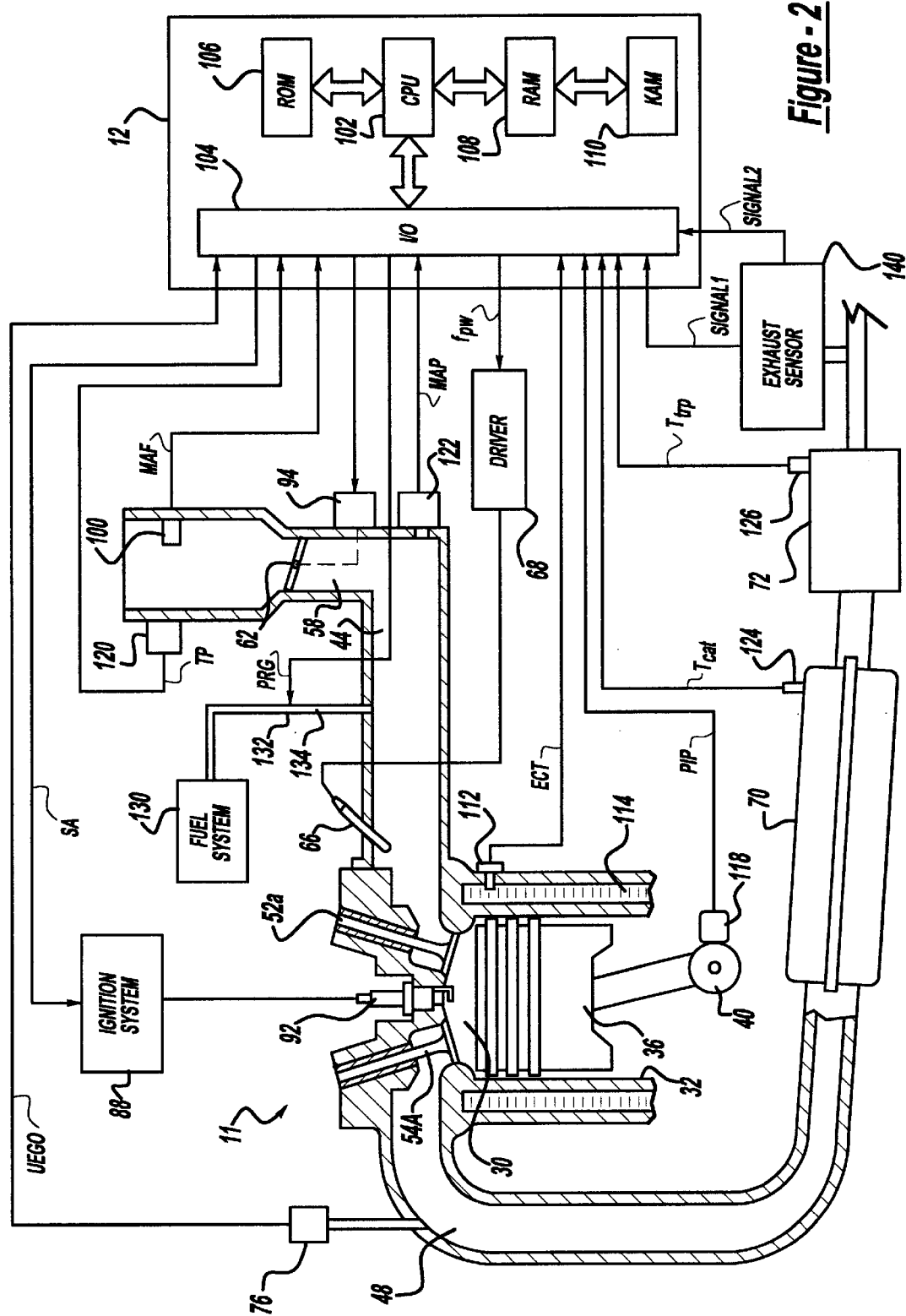

Referring now to FIG. 2, a port fuel injection engine 10 is shown where fuel is injected through injector 66 into intake manifold 44. Engine 10 is operated homogeneously substantially at stoichiometry, rich of stoichiometry, or lean of stoichiometry. Fuel is delivered to fuel injector 66 by a conventional fuel system (not shown) including a fuel tank, fuel pumps, and a fuel rail.

Those skilled in the art will recognize, in view of this disclosure, that the methods of the present invention can be used to advantage with either port fuel injected or directly injected engines.

Figure 3:
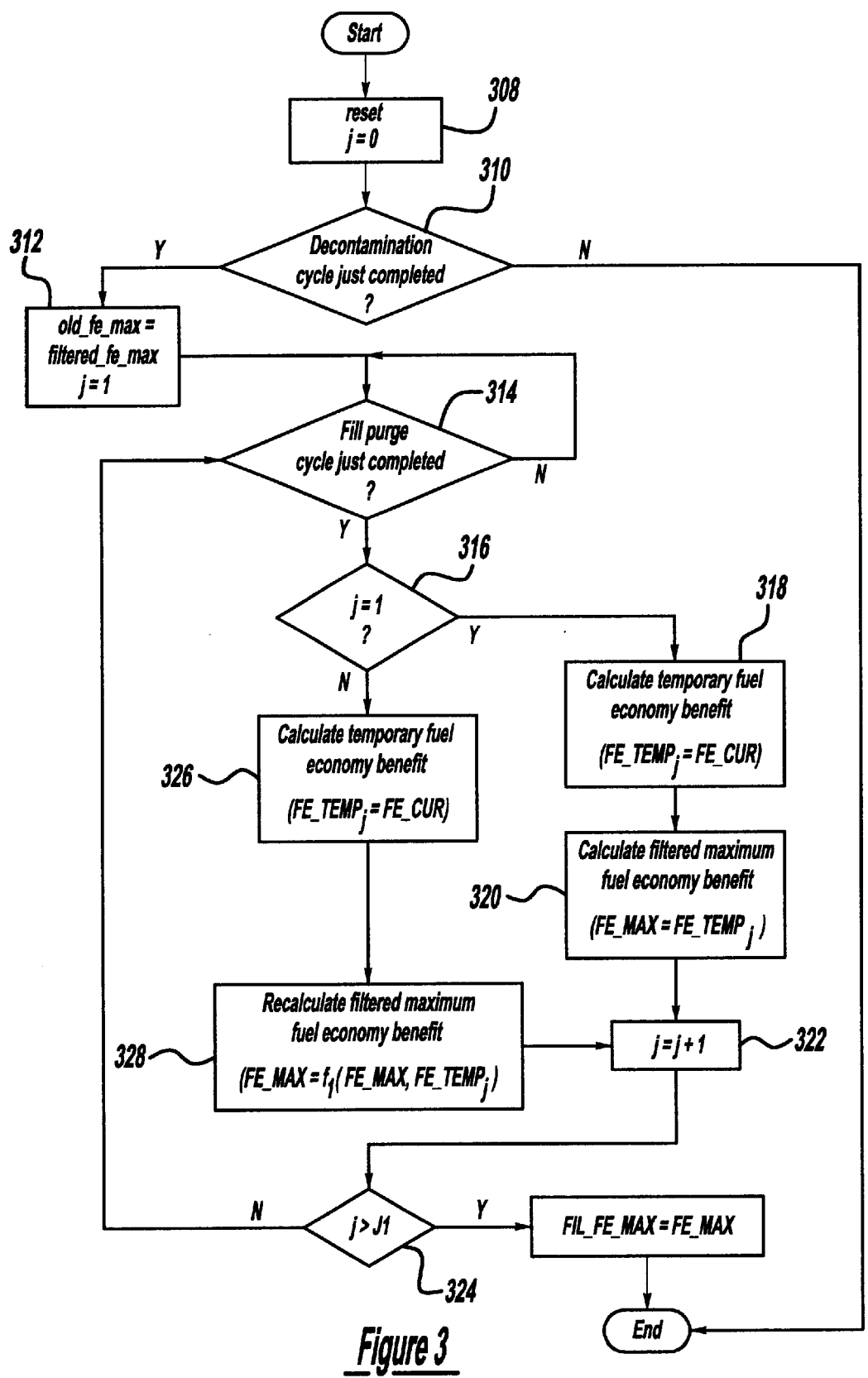
Figure 4:
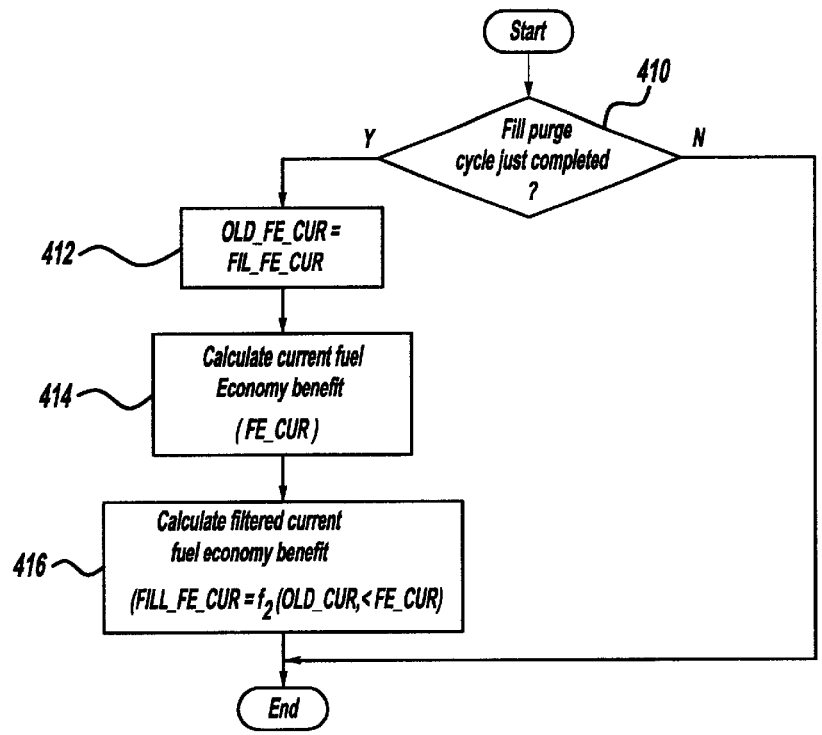
Figure 5:
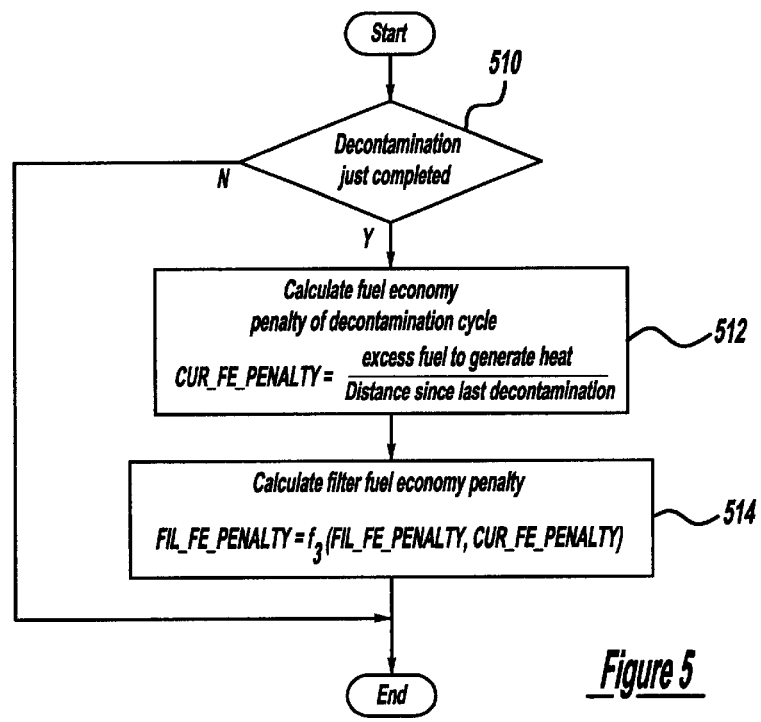

Referring now to FIGS. 3–5, routines for determining performance impacts of operating in various engine operating conditions are described. In a preferred embodiment, performance impact is a fuel economy percentage impact over stoichiometric operation. The impact can be a benefit, where fuel is saved over stoichiometric operation, or a fuel loss. In other words, the following routines determine fuel economy saved relative to stoichiometric operation or fuel economy lost relative to stoichiometric operation. However, those skilled in the art will recognize in view of this disclosure various other performance impacts that can be used to compare different operation modes such as, for example, fuel usage impact, fuel efficiency impact, fuel savings, fuel loss, engine efficiency impact, fuel savings per distance traveled by the vehicle, or a driveability impact.

Referring now specifically to FIG. 3, a routine is described for determining a maximum fuel economy benefit that can be provided when operating lean, assuming that emission control device 72 has been decontaminated. More specifically in a preferred embodiment, that a sulfur decontamination has been completed. In other words, the routine determines the maximum potential fuel economy benefit that can be provided after performing a decontamination cycle. First, in step 308, counter j is reset equal to zero. Next, in step 310, a determination is made as to whether a decontamination cycle has just been completed. A decontamination cycle, as described herein, refers to any operating cycle where engine operating conditions are changed to remove a contaminant. For example, a sulfur decontamination cycle where exhaust gas temperature is raised and the engine is operated substantially at or rich of stoichiometry to remove sulfur contaminating emission control device 72 is one such decontamination cycle. When the answer to step 310 is YES, the routine continues to step 312 where parameter OLD_FE_MAX is set equal to parameter FILTERED_FE_MAX. Also, in step 312, counter j is set equal to one. Counter j keeps track of the number of NOx fill/purge cycles after a decontamination cycle over which the maximum fuel economy benefit is average. Next, in step 314, a determination is made as to whether a NOx fill/purge cycle has just been completed. When the answer to step 314 is YES, a determination is made as to whether counter j equals one. When the answer to step 316 is YES, the routine continues to step 318. In step 318, the routine calculates temporary fuel economy benefit (FE_TEMP$_j$) based on current fuel economy benefit (FE_CUR), where current fuel economy benefit is calculated as described below. This temporary fuel economy benefit represents the fuel economy benefit averaged over a NOx fill/purge cycle that is achieved compared to operating the engine substantially at stoichiometry. Next, in step 320, maximum fuel economy benefit (FE MAX) is calculated based on temporary fuel economy benefit. Next, in step 322, counter j is incremented. Next, in step 324, a determination is made as to whether counter j is greater than predetermined value J1. Predetermined value J1 represents the number of NOx fill/purge cycles after a decontamination cycle over which maximum fuel economy benefit, provided by lean operation relative to stoichiometric operation, is calculated. In a preferred embodiment, predetermined value J1 represents the number of NOx fill/purge cycles after a decontamination cycle over which maximum fuel economy benefit, is averaged. This averaging allows variations in vehicle operating conditions to be accounted in determining maximum fuel economy benefit so that a representative value is obtained. When the answer to step 324 is YES, the filtered maximum fuel economy benefit (FIL_FE_MAX) is set equal to maximum fuel economy benefit.

Continuing with FIG. 3, when the answer to step 316 is NO, temporary fuel economy benefit (FE_TEMP$_j$) is calculated in step 326 based on current fuel economy benefit (FE_CUR). Current fuel economy benefit (FE_CUR) represents the current fuel economy benefit relative to stoichiometric operation provided by lean operation and is calculated based on operating conditions. In particular, as described in U.S. patent application Ser. No. 09/528,217, titled "METHOD AND APPARATUS FOR CONTROLLING LEAN-BURN ENGINE BASED UPON PREDICTED PERFORMANCE IMPACT", filed concurrently with the present application on Mar. 17, 2000, attorney docket number 199-0979, assigned to the same assignee as the present application, which is hereby expressly incorporated by reference, a performance impact is set as a percentage fuel economy benefit/loss associated with engine operation at a selected lean or rich operating condition relative to a reference stoichiometric operating condition at MBT, the controller 12 first determines whether the lean-burn feature is enabled. If the lean-burn feature is enabled as, for example indicated by the lean-burn running flag LB_RUNNING_FLG being equal to logical one, the controller 12 determines a first value TQ_LB representing an indicated torque output for the engine when operating at the selected lean or rich operating condition, based on its selected air-fuel ratio LAMBSE and the degrees DELTA_SPARK of retard from MBT of its selected ignition timing, and further normalized for fuel flow. Then, controller 12 determines a second value TQ_STOICH representing an indicated torque output for the engine 10 when operating with a stoichiometric air-fuel ratio at MBT, likewise normalized for fuel flow. In particular, TQ_LB is determined as a function of desired engine torque, engine speed, desired air-fuel ratio, and DELTA_SPARK. Further, TQ_STOICH is determined as a function of desired engine torque and engine speed. Next, the controller 12 calculates the lean-burn torque ratio TR_LB by dividing the first normalized torque value TQ_LB with the second normalized torque value TQ_STOICH.

Continuing, the controller 12 determines a value SAVINGS representative of the cumulative fuel savings to be achieved by operating at the selected lean operating condition relative to the reference stoichiometric operating condition, based upon the air mass value AM, the current (lean or rich) lean-burn air-fuel ratio (LAMBSE) and the determined lean-burn torque ratio TR_LB, wherein $$SAVINGS = SAVINGS + (AM*LAMBSE*14.65*(1-TR)).$$

The controller 12 then determines a value DIST_ACT_CUR representative of the actual miles traveled by the vehicle since the start of the last trap purge or desulfurization event. While the "current" actual distance value DIST_ACT_CUR is determined in any suitable manner, in the exemplary system, the controller 14 determines the current actual distance value DIST_ACT_CUR by accumulating detected or determined instantaneous values VS for vehicle speed.

Because the fuel economy benefit to be obtained using the lean-burn feature is reduced by the "fuel penalty" of any associated trap purge event, in the exemplary system, the controller 12 determines the "current" value FE_CUR, for fuel economy benefit only once per NOx fill cycle. And, because the purge event's fuel penalty is directly related to the preceding trap "fill," the current fuel economy benefit value FE_CUR is preferably determined at the moment that the purge event is deemed to have just been completed, as described below.

Continuing with FIG. 3, in step 328, maximum fuel economy benefit is calculated as a function ($f_1$) of maximum fuel economy benefit and temporary fuel economy benefit. In this way, the fuel economy benefit provided by a decontaminated emission control device is filtered over several NOx fill/purge cycles. In a preferred embodiment, the filtering is performed by a rolling average function of the form in the following equation where (fk) is a filter coefficient between zero and one. Those skilled in the art will recognize, in view of this disclosure, this as a single pole low pass filter.

output=(1−*fk*)output+(*fk*)input or, output=(1−*fk*)old_output+(*fk*)input, old_output=output Thus, according to the present invention, it is possible to determine the fuel economy benefit provided by a decontaminated emission control device.

Referring now to FIG. 4, a routine is described for determining the present, or current, fuel economy benefit that is being provided by operating lean of stoichiometry with the emission control device 72 in its present state, be it contaminated or decontaminated. First, in step 410, a determination is made as to whether a NOx fill/purge cycle has just been completed. When the answer to step 410 is YES, the routine continues to step 412 where parameter OLD_FE_CUR is set equal to parameter FIL_FE_CUR. Next, in step 414, the routine calculates the current fuel economy benefit (FE_CUR). Next, in step 416, the routine calculates the filtered current fuel economy benefit (FIL_FE_CUR) based on a filtered value of the current fuel economy benefit, and parameter OLD_FE_CUR. In other words, the current fuel economy benefit (FIL_FE_CUR) represents the fuel economy benefit that will be realized if the system continues to operate as it currently does and no decontamination is performed. Accordingly, (FIL_FE_CUR) is the fuel economy benefit that will be achieved by not performing a decontamination cycle.

In a preferred embodiment, function ($f_2$) represents the rolling average function describe above herein. Thus, according to the present invention, a fuel economy benefit averaged over several NOx fill/purge cycle can be determined. This value can then be used to advantage in various ways since it indicates an on-line measure of the improved fuel economy performance provided by lean operation averaged to remove cycle to cycle variation.

Referring now to FIG. 5, a routine is described for determining a fuel economy penalty experienced by performing a decontamination cycle. More specifically, in a preferred embodiment, a decontamination cycle that removes SOx. First, in step 510, a determination is made as to whether a decontamination cycle has just been completed. When the answer to step 510 is YES, the routine continues to step 512 where a fuel economy penalty is calculated. The current fuel economy penalty of the last decontamination cycle (CUR_FE_PENALTY) is calculated by dividing the excess fuel used to generate heat or the excess fuel used to operate in one condition compared to another condition by the distance between decontamination cycles. In other words, the penalty of performing a decontamination cycle is spread over the distance between two decontamination cycles. Next, in step 514, a filtered fuel economy penalty is calculated by filtering the current fuel economy penalty according to function ($f_3$) which, in a preferred embodiment, represents the rolling average function describe above herein. Thus, according to the present invention, it is possible to determine the fuel economy penalty experienced by performing a decontamination cycle. In an alternative embodiment, the fuel economy penalty to perform a decontamination cycle can be set to a predetermined value.

Those skilled in the art will recognize, in view of this disclosure, various alterations of the present invention that achieve a similar result. For example, the average excess fuel used during several decontamination cycles can be divided by the total distance between all of the decontamination cycles, thereby providing an averaged fuel economy penalty for performing a decontamination cycle.

In an alternate embodiment, fuel economy penalty to perform a decontamination cycle can be stored as a function of vehicle and/or engine operating parameters. For example, fuel economy penalty can be stored versus vehicle speed and exhaust gas temperature experienced before performing said decontamination cycle. Those skilled in the art will recognize, in view of this disclosure, various other factors that affect a fuel economy penalty to perform a decontamination cycle such as, for example, engine speed, mass air flow, manifold pressure, ignition timing, air-fuel ratio, exhaust gas recirculation amount, and engine torque.

In yet another embodiment, fuel economy penalty can be determined as now described. First, controller 12 updates a stored value DIST_ACT_DSX representing the actual distance that the vehicle has traveled since the termination or "end" of the immediately-preceding desulfurization, or decontamination, event. Then, the controller 12 determines whether a desulfurization event is currently in progress. While any suitable method is used for desulfurizing the trap, an exemplary desulfurization event is characterized by operation of some of the engine's cylinders with a lean air-fuel mixture and other of the engine's cylinders with a rich air-fuel mixture, thereby generating exhaust gas with a slightly-rich bias. Next, the controller 12 determines the corresponding fuel-normalized torque values TQ_DSX_LEAN and TQ_DSX_RICH, as a function of current operating conditions. In particular, TQ_DSX_LEAN and TQ_DSX_RICH are determined as functions of desired engine torque, engine speed, desired air-fuel ratio, and DELTA_SPARK. Then, the controller 12 further determines the corresponding fuel-normalized stoichiometric torque value TQ_STOICH as a function of desired engine torque and engine speed. The controller 12 then calculates a cumulative fuel economy penalty value, as follows:

PENALTY=PENALTY+(AM/2*LAMBSE*14.65*(1−TR_DSX_LEAN))+(AM/2*LAMBSE*14.65*(1−TR_DSX_RICH))

Then, the controller 12 sets a fuel economy penalty calculation flag to thereby ensure that the current desulfurization fuel economy penalty measure FE_PENALTY_CUR is determined immediately upon termination of the on-going desulfurization event.

If the controller 12 determines that a desulfurization event has just been terminated, the controller 12 then determines the current value FE_PENALTY_CUR for the fuel economy penalty associated with the terminated desulfurization event, calculated as the cumulative fuel economy penalty value PENALTY divided by the actual distance value DIST_ACT_DSX. In this way, the fuel economy penalty associated with a desulfurization event is spread over the actual distance that the vehicle has traveled since the immediately-prior desulfurization event. Next, the controller 12 calculates a rolling average value FE_PENALTY of the last m current fuel economy penalty values FE_PENALTY_CUR to thereby provide a relatively-noise-insensitive measure of the fuel economy performance impact of such desulfurization events. The value FE_PENALTY can be used in place of value FIL_FE_PENALTY. By way of example only, the average negative performance impact or "penalty" of desulfurization typically ranges between about 0.3 percent to about 0.5 percent of the performance gain achieved through lean-burn operation. Finally, the controller 12 resets the fuel economy penalty calculation flag FE_PNLTY_CALC_FLG, along with the previously determined (and summed) actual distance value DIST_ACT_DSX and the current fuel economy penalty value PENALTY, in anticipation for the next desulfurization event.

Figure 6:
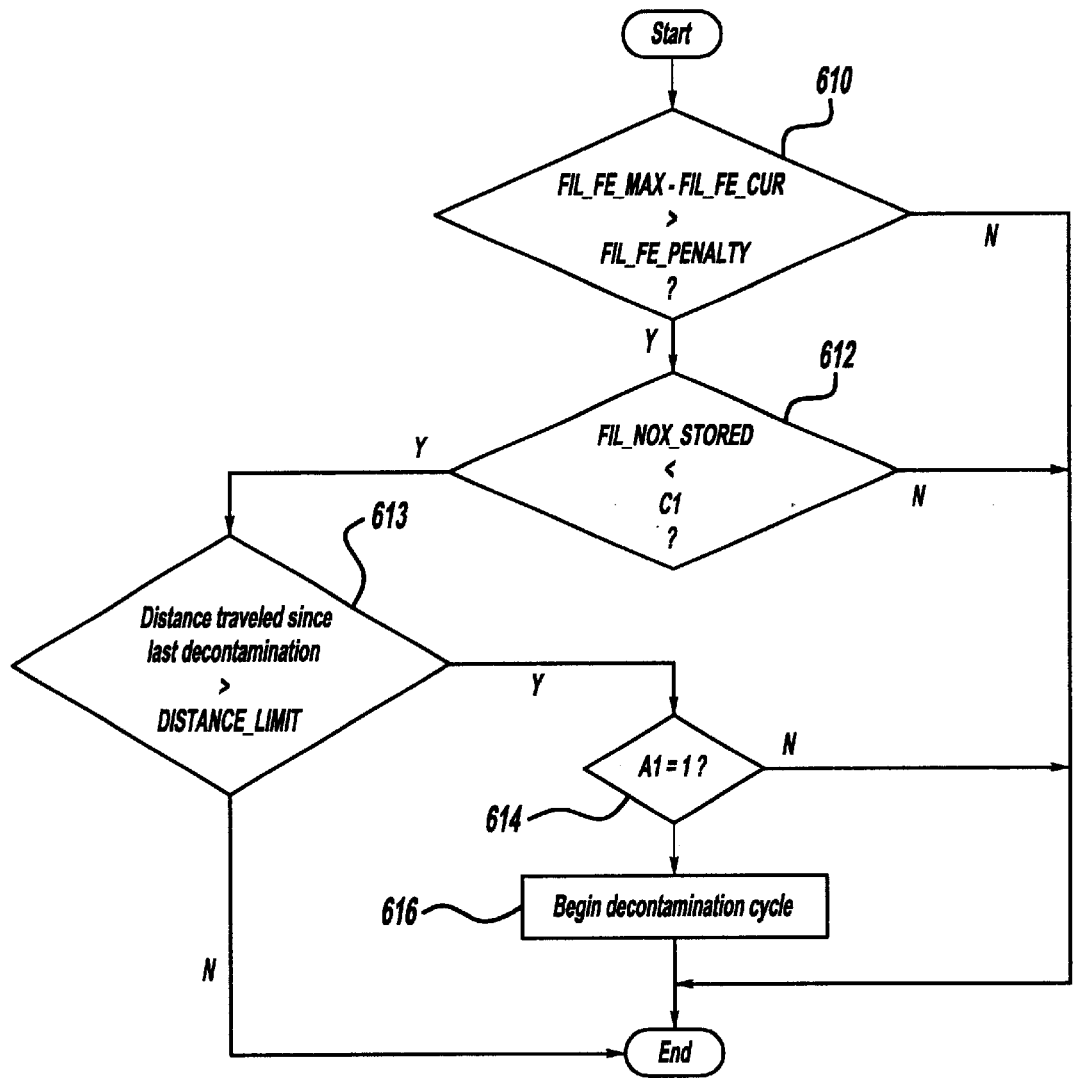

Referring now to FIG. 6, a routine is described for determining whether to commence, or begin, a decontamination cycle. First, in step 610, a determination is made as to whether the maximum potential fuel economy benefit provided a decontaminated emission control device minus the current fuel economy benefit being provided by the decontamination cycle in its present condition is greater than the fuel economy penalty experienced by performing a decontamination cycle. In particular, the difference between parameter FIL__FE__MAX and parameter FIL__FE__CUR is compared to parameter FIL__FE__PENALTY. When the answer to step 610 is YES, the routine has determined that greater fuel economy can be provided by performing a decontamination cycle rather than continuing with operating the engine lean of stoichiometry and performing NOx fill/purge cycles. When the answer to step 610 is NO, the routine has determined that greater fuel economy can be provided by continuing operation in the present condition. In other words, operating with the emission control device in its present condition provides better fuel economy than attempting to improve operation of the emission control device by performing a decontamination cycle. Next, in step 612, a determination is made as to whether normalized NOx storage ability (FIL__NOX__STORED) of the emission control device is less than limit value C1. Normalized stored NOx (FIL__NOX__STORED) is calculated as described later herein with particular reference to FIGS. 9 and 10. When the answer to step 612 is YES, the routine continues to step 613 where a determination is made as to whether vehicle distance traveled since the last decontamination cycle is greater than limit distance (DISTANCE__LIMIT). When the answer to step 613 is YES, the routine continues to step 614 where a determination is made as to whether parameter A1 is equal to one. Parameter A1 is determined based on vehicle activity as described later herein with particular reference to FIG. 7. When the answer to step 614 is YES a decontamination cycle is begun in step 616. The embodiment shown in FIG. 6 is that for the example of a port fuel injected engine. In an alternate embodiment which can be used for direct injection engines, step 614 is eliminated. This is because in port fuel injected engines, it is challenging to provide well controlled decontamination temperatures under all operating conditions. However, in a direct injection engine, since fuel can be injected during the exhaust stroke to heat the exhaust system, decontamination can be performed at almost any time.

Figure 7:
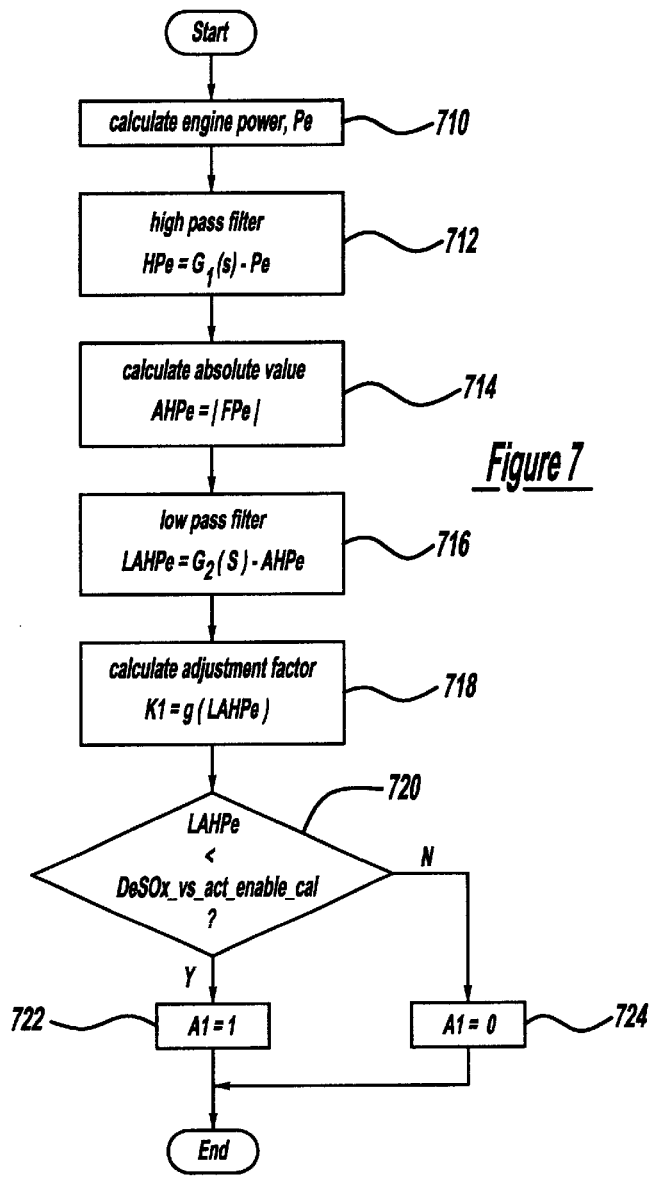

Referring now to FIG. 7, a routine is described for determining vehicle activity. First, in step 710, a the routine calculates engine power (Pe). In a preferred embodiment, this is the actual engine power, however, in a preferred embodiment, desired engine power can be used. Also, various other parameters can be used in place of engine power, such as, for example: vehicle speed, engine speed, engine torque, wheel torque, or wheel power. Next, in step 712, engine power (Pe) is filtered with a high pass filter $G_1(s)$, where s is the Laplace operator known to those skilled in the art., to produce high pass filtered engine power (HPe). Next, in step 714, the absolute value (AHPe) of the pass filtered engine power (HPe) is calculated. In step 716, the absolute value (AHPe) is low pass filtered with filter $G_1(s)$ to produce signal (LAHPe). In step 718, adjustment factor K1 calculated as a predetermined function g of signal (LAHPe). Then, in step 720, a determination is made as to whether signal (LAHPe) is less than the calibration parameter (DESOX__VS__ACT__ENABLE__CAL). When the answer to step 720 is YES, parameter A1 is set to one in step 722. Otherwise, value A1 is set to zero in step 724.

Figure 8:
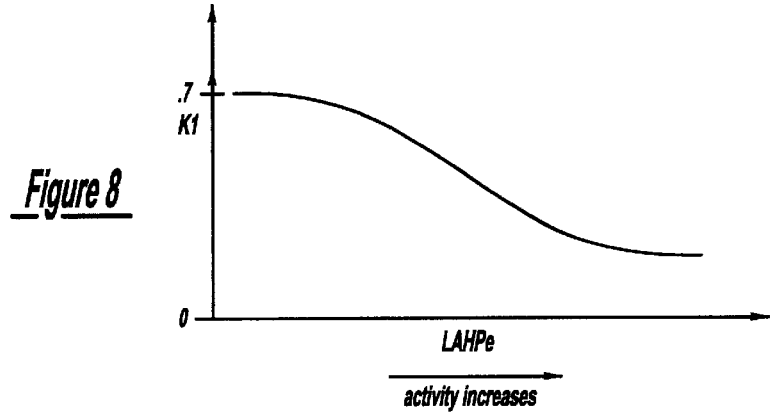

Referring now to FIG. 8, a graph of function g shows how adjustment factor K1 varies as a function of signal (LAHPe) in a preferred embodiment. As shown in the preferred embodiment, as vehicle activity increases, adjustment factor K1 is reduced. As vehicle activity decreases, adjustment factor K1 is increased to a maximum value of 0.7.

Figure 9:
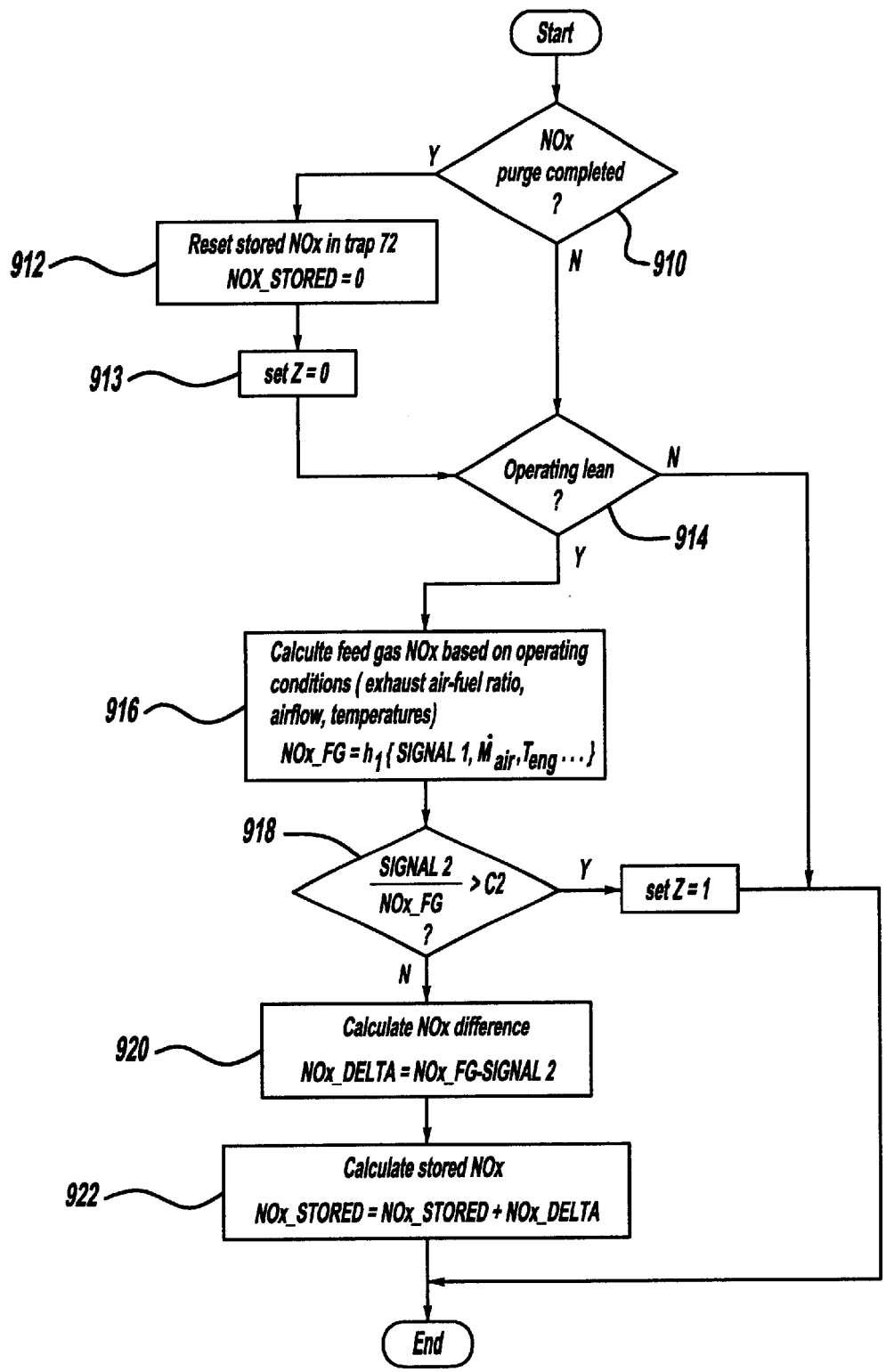

Referring now to FIGS. 9 and 10, a routine for determining NOx stored in an emission control device is described. In particular, the routine describes a method for determining a consistent measure of NOx stored that can be averaged over several NOx purge/fill cycles. First, in step 910, a determination is made as to whether a NOx purge has just been completed. In an alternate embodiment, an additional check as to whether lean operation has commenced can also be used. When the answer to step 910 is YES, NOx stored estimated (NOX__STORED) is reset to zero in step 912. In particular, the routine assumes that a complete NOx purge was completed and all stored NOx was removed. However, in an alternate embodiment, if only part of the NOx was purged, NOx stored in step 912 would be set to this partial value rather than zero. Next, in step 913, flag Z is set to zero to indicate that the stored NOx value is not fully estimated. Next, in step 914, a determination is made as to whether the engine is operating lean of stoichiometry. When the answer to step 914 is YES, the routine continues to step 916. In step 916, a calculation of feedgas NOx (NOX__FG) based on operating conditions is generated. In particular, feedgas NOx generated by the engine is calculated based on function (h1) using operating conditions such as, for example, SIGNAL1 (or desired air-fuel ratio of the engine), mass air flow (mair), engine temperature (TENG), and engine speed (RPM). This feedgas NOx can then be used to represent the NOx entering NOx trap 72. Those skilled in the art will recognize, in view of this disclosure, that various additional factors can be used such as factors that account for an NOx storage or reduction due to activity of three way catalyst 70.

Continuing with FIG. 9, in step 918, a determination is made as to whether the ratio of NOx exiting trap 72 to NOx entering trap 72 is greater than threshold C2. For example, threshold C2 can be set to 0.65. When the answer to step 918 is NO, a NOx difference (NOX__DELTA) is calculated between NOx entering (NOX__FG) and NOx exiting (SIGNAL2) in step 920. Next, in step 922, an accumulated NOx storage (NOX__STORED) is determined by numerically summing NOx difference (NOX__DELTA). When the answer to step 918 is YES, flag Z is set to one to indicate that a consistent measure of NOx stored has been completed and fully estimated.

Referring now to FIG. 10, in step 1012, a determination is made as to whether a NOx purge has just been completed. When the answer to step 1012 is YES, the routine continues to step 1014. In step 1014, filtered normalized NOx stored (FIL__NOX__STORED) is calculated by filtering NOx stored (NOX__STORED) according to function ($f_4$) which, in a preferred embodiment, represents the rolling average function describe above herein.

Thus, according to the present invention, it is possible to calculate a value representing a consistent and normalized NOx storage value that can be used in determining degradation and determining whether to perform a decontamination cycle.

Referring now to FIG. 11, a routine is described for using first output signal (SIGNAL1) of sensor 140 for performing closed loop air-fuel ratio control. First, in step 1110, a determination is made as to whether the absolute value of the difference between SIGNAL1 and stoichiometric air-fuel ratio (air__fuel__stoich) is greater than a predetermined difference (D1). In other words, a determination is made as to whether the first output signal of exhaust sensor 140 is indicating an exhaust air-fuel ratio away from stoichiometry. When the answer to step 1110 is YES, the routine continues to step 1112. In step 1112, the routine determines an air-fuel error (afe) based on the difference between desired air-fuel ratio (air_fuel_desired) and the first output signal (SIGNAL1). Next, in step 1114, the routine generates fuel injection signal (fpw) based on the determined error (afe) and the cylinder charge (m_cyl_air) and desired air-fuel ratio (air_fuel_desired). In addition, function g2 is used to modify the air-fuel error (afe) and can represent various control functions such as, for example, a proportional, integral and derivative controller. Also, function g1 is used to convert the desired mass of fuel entering the cylinder into a signal that can be sent to fuel injector 66. Also, those skilled in the art will recognize, in view of this disclosure, that various other corrections involving information from other exhaust gas sensors can be used. For example, additional corrections from sensor 76 can be used.

When the step 1110 is NO, the routine continues to step 1116 and calculates fuel injection signal (fpw) based on the cylinder charge amount and the desired air-fuel ratio using function g1. Thus, according to the present invention, it is possible to improve open-loop fueling control using the first output of sensor 140, which is located downstream of NOx trap 72, whenever the first output signal indicates a value away from stoichiometry. In this way, NOx storage and oxygen storage, as well as NOx reduction, do not adversely closed-loop feedback air-fuel control using a sensor located downstream of a NOx trap.

Figure 12:
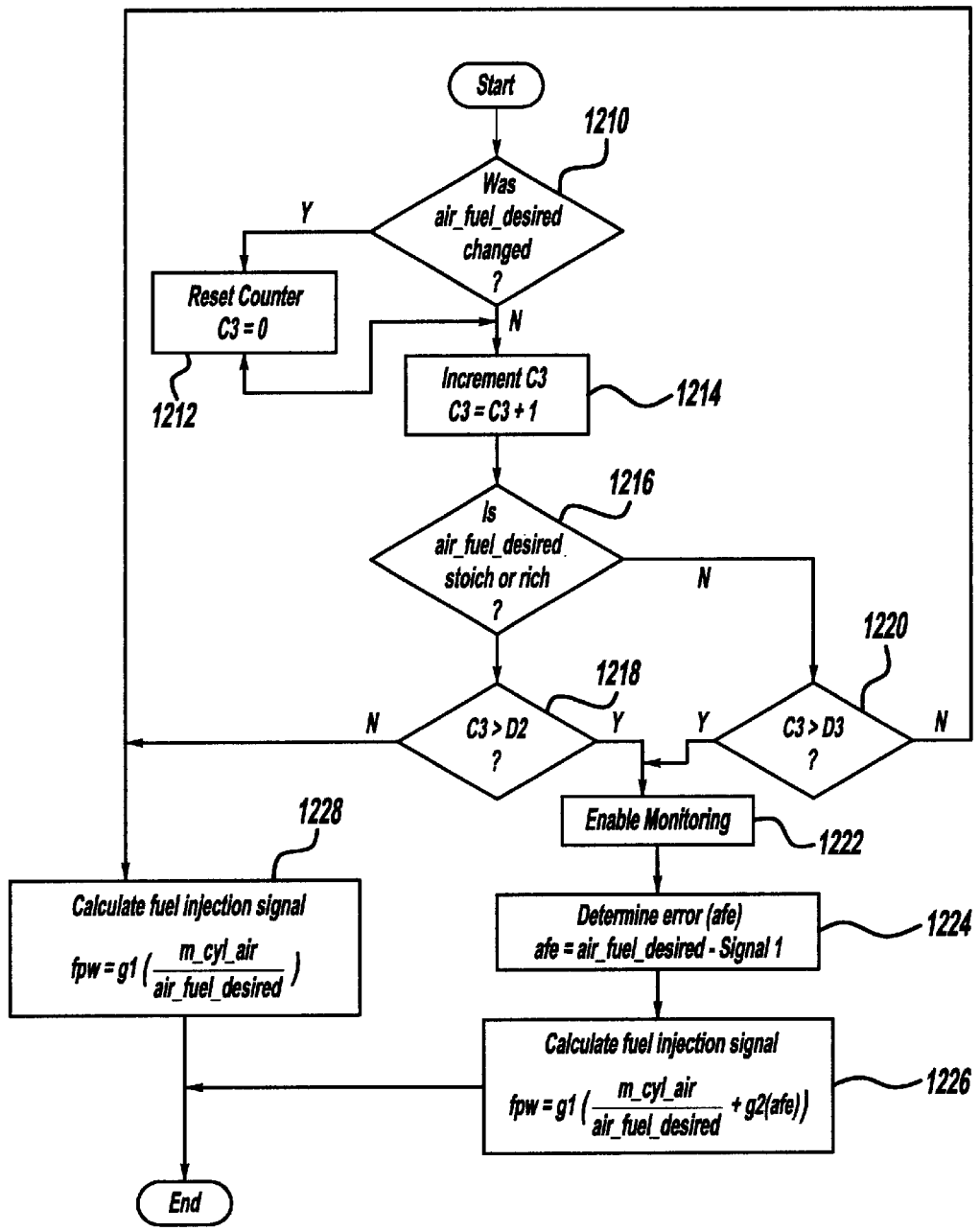

Referring now to FIG. 12, an alternate routine to that described in FIG. 11 is shown. In this alternate routine, various timers are used to gate out the first output of exhaust sensor 140 for use in feedback air-fuel ratio control whenever it is determined that one of the following conditions is present: oxgen is being stored in NOx trap 72, and/or nitrogen oxide is being released and reduced by a reducing constituent in the exhaust gas in NOx trap 72. Also, this alternate embodiment can be used to advantage to determine when to enable monitoring of exhaust sensor 140 as described later herein with particular reference to FIGS. 13 and 14.

Continuing with FIG. 12, in step 1210, a determination is made as to whether the desired air-fuel ratio (air_fuel_desired) has been changed. In particular, a determination is made as to whether the desired air-fuel ratio has changed from rich or stoichiometric to lean, or whether the desired air-fuel ratio has changed from lean to stoichiometric or rich. When the answer to step 1210 is YES, the counter C3 is reset to zero. Otherwise, in step 1214, counter C3 is incremented. Next, in step 1216, a determination is made as to whether the desired air-fuel ratio is stoichiometric or rich. When the answer to step 1216 is YES, a determination is made as to whether counter C3 is greater than threshold value D2 in step 1218. Otherwise, when the answer to step 1216 is NO, a determination is made as to whether counter C3 is greater than threshold value D3 in step 1220. When the answer to either step 1218 or step 1220 is YES, the routine enables monitoring in step 1222.

In other words, duration D2 and duration D3 represent periods before which first output of exhaust sensor 140 cannot be used for feedback control because it will indicate stoichiometric even when the exhaust air-fuel ratio entering NOx trap 72 is not stoichiometric. Thus, when changing from stoichiometric or rich to lean, first output of exhaust sensor 140 is valid for monitoring or feedback control after duration D3. Similarly, when changing from lean operation to rich or stoichiometric operation, first output of exhaust sensor 140 is valid for monitoring or feedback control after duration D2. In a preferred embodiment, duration D2 is based on oxygen storage of trap 72 and duration D3 is based on both oxygen storage and NOx storage of trap 72. Stated another way, once the oxygen storage is saturated when changing from rich to lean, SIGNAL1 is indicative of the air-fuel ratio entering trap 72. And once the oxygen stored and NOx stored is reduced when changing from lean to rich, SIGNAL1 is indicative of the air-fuel ratio entering trap 72.

Continuing with FIG. 12, in step 1224, a determination of air-fuel error (afe) is made by subtracting desired air-fuel ratio (air_fuel_desired) and first output of exhaust sensor 140 (SIGNAL1). Next, in step 1226, fuel injection signal (fpw) is calculated in a manner similar to step 1114.

When the answers to either step 1218 or step 1220 are NO, the routine continues to step 1228 to calculate fuel injection signal (fpw) as described herein in step 1116. Thus, according to the present invention, it is possible to utilize the first output of exhaust sensor 140 for feedback air-fuel control.

Figure 13:
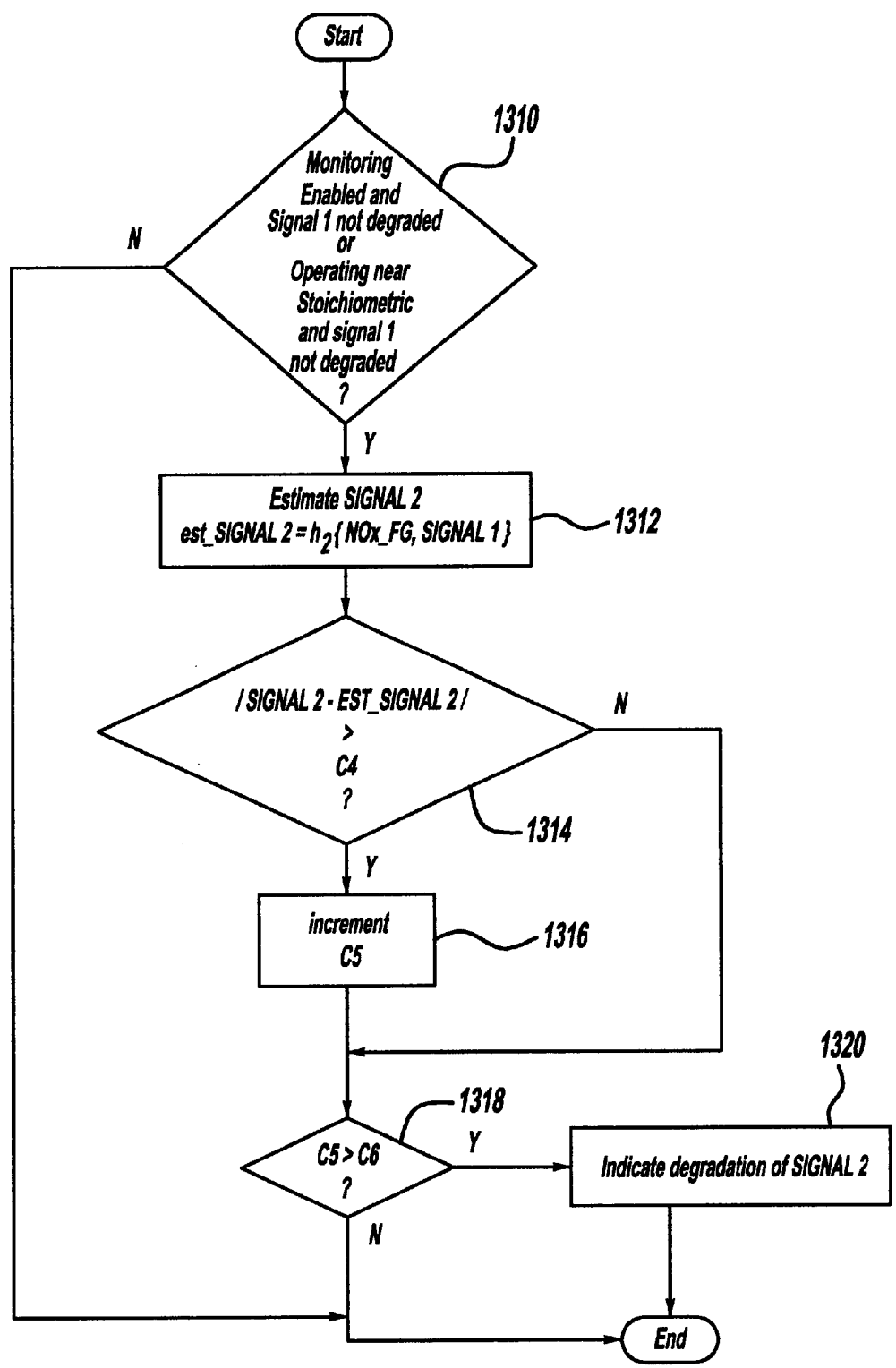

Referring now to FIG. 13, a routine is described for determining degradation of the second output signal of exhaust sensor 140. In particular, a routine is described for determining degradation of indicated NOx concentration based on the first output signal of exhaust gas sensor 140, when the first output signal is indicative of an exhaust air-fuel ratio. First, in step 1310, a determination is made as to whether monitoring is enabled as described in step 1222, or whether the engine is operating in a near stoichiometric condition. Further, a determination is also made as to whether the first output signal of exhaust sensor 140 is degraded. In other words, when SIGNAL1 is indicative of the air-fuel ratio entering trap 72, it can be used to provide an estimate of NOx concentration exiting trap 72. When the answer to step 1310 is YES, the routine continues to step 1312. In step 1312, the routine estimates the second output signal (est_signal 2) based on several conditions. In particular, function h2 is used with the feed gas NOx (NOx_fg) and the first output signal of exhaust sensor 140 (SIGNAL1). In other words, the routine attempts to estimate NOx exiting trap 72 based on NOx entering trap 72 and exhaust air-fuel ratio. In addition, various other dynamic effects of NOx trap 72 can be added to account for oxygen storage and nitrogen oxide and oxygen reduction. Further, efficiency of trap 72 can be included to estimate NOx exiting based on NOx entering trap 72. However, if performed during stoichiometric operation, it can be assumed that net NOx stored is constant. Next, in step 1314, the absolute value of the difference between the estimated NOx exiting trap 72 (EST_SIGNAL2) and measured second output of exhaust sensor 140 (SIGNAL2) is compared to threshold value C4. When the answer to step 1314 is YES, counter C5 is incremented in step 1316. Next, in step 1318, a determination is made as to whether counter C5 is greater than threshold C6. When the answer to step 1318 is YES, the routine indicates degradation of the second output of exhaust sensor 140 in step 1320.

Thus, according to the present invention, it is possible to determine when the NOx sensor, which is the second output of exhaust sensor 140, has degraded by comparing to an estimated value of exiting NOx trap 72.

Figure 14:
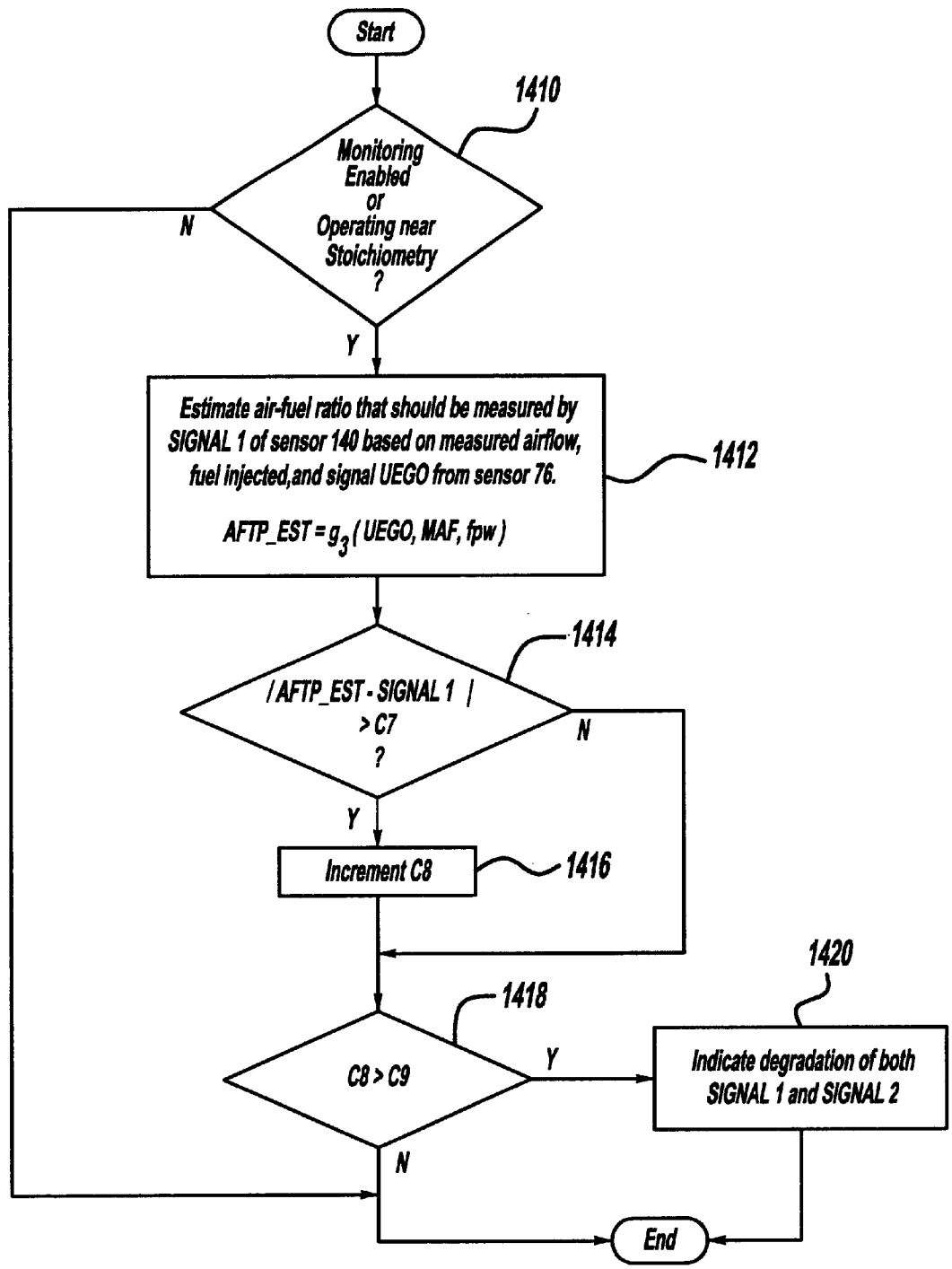

Referring now to FIG. 14, a routine is described for determining degradation of the second output signal of sensor 140 based on the first output signal of sensor 140. First, a determination is made in step 1410 as to whether monitoring has been enabled or whether operating near stoichiometry. When the answer to step 1410 is YES, the routine continues to step 1412. In step 1412, the routine estimates air-fuel ratio that should be measured by the first output signal (SIGNAL1) of exhaust sensor 140. In other words, the routine estimates exhaust air-fuel ratio exiting NOx trap 72 based on various operating parameters. The estimated air-fuel ratio (AFTP_EST) is estimated based on air-fuel ratio measured by sensor 76 (UEGO), mass airflow measured by mass airflow sensor 100, and fuel injection amount (fpw) in a preferred embodiment. Those skilled in the art will recognize, in view of this disclosure, various other signals and methods that can be used to estimate exhaust air-fuel ratio exiting a NOx trap. For example, dynamic effects of both catalyst 70 and 72 can be included that account for NOx storage, oxygen storage, temperature effects, and various other effects known to those skilled in the art.

Continuing with FIG. 14, in step 1414, the absolute value of the difference between the estimated exhaust air-fuel ratio (AFTP_EST) in the first output signal of exhaust gas sensor 140 (SIGNAL1) is compared to threshold C7. When the answer to step 1414 is YES, counter C8 is incremented in step 1416. Next, in step 1418, counter C8 is compared to threshold C9 in step 1418. When the answer to step 1418 is YES, an indication is provided in step 1420 that both the first output signal and a second output signal of exhaust sensor 140 have been degraded. Thus, according to the present invention, it is possible to determine that the NOx concentration measured by the second output signal of exhaust sensor 140 is degraded when it is determined that the oxygen partial pressure indicated in the first output signal of exhaust sensor 140 has been degraded.

Figure 15A:
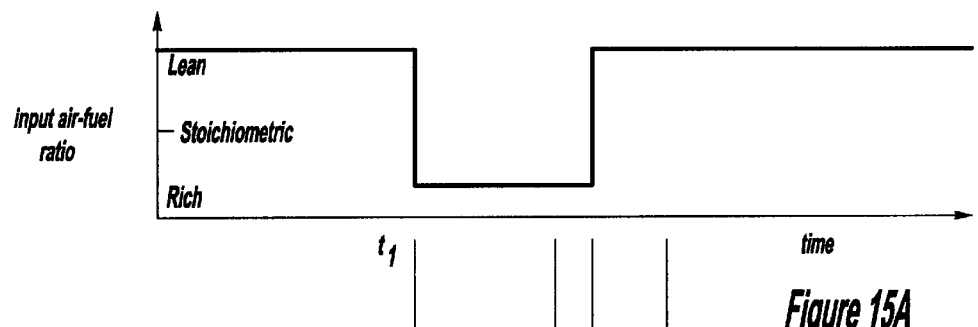
Figure 15B:
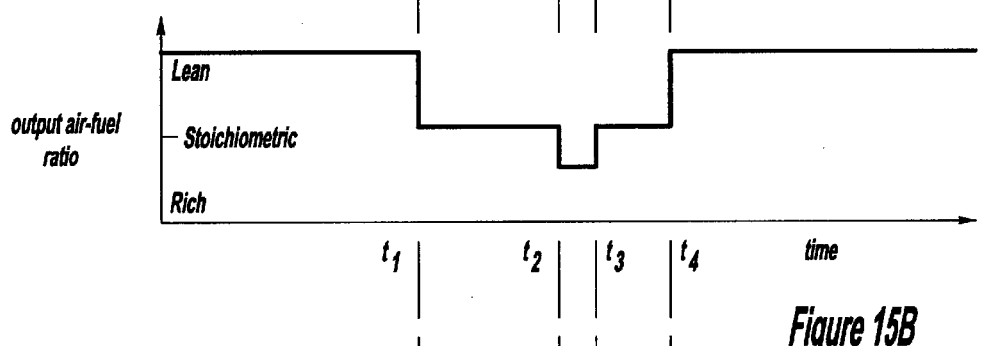
Figure 15C:
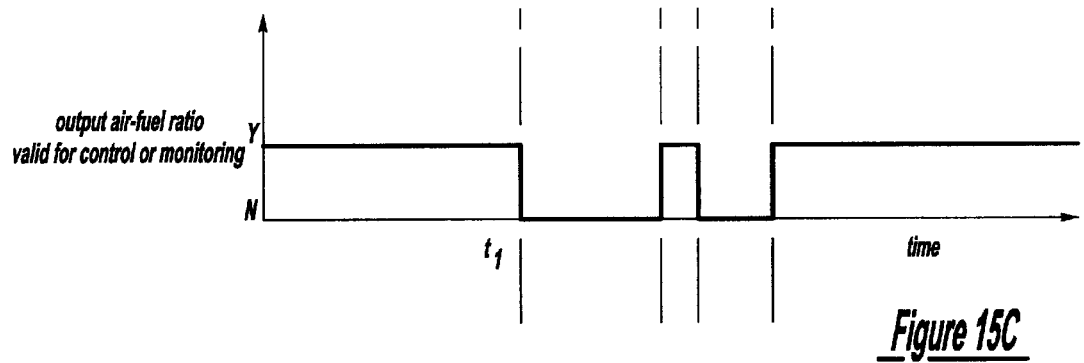

Referring now to FIGS. 15A–15C, these figures show an example of operation according to the present invention. In particular, the graphs show when first output signal (SIGNAL1) of sensor 140 is valid for air-fuel control or for monitoring. FIG. 15A shows air-fuel ratio entering NOx trap 72 versus time. FIG. 15B shows air-fuel-ratio exiting NOx trap 72 versus time. FIG. 15C indicates whether first output signal (SIGNAL1) of sensor 140 is valid for air-fuel control or for monitoring.

Before time t1, the entering air-fuel ratio and exiting air-fuel ratio are both lean and first output signal (SIGNAL1) is valid for control or monitoring. Then, at time t1, a determination is made to end lean operation and purge NOx stored in trap 72 due to tailpipe grams of NOx/mile, or because a fuel economy benefit is no longer provided by operating lean, or for various other reasons as described above herein. At time t1, entering air-fuel ratio is changed from lean to rich. Similarly, at time t1, lair-fuel ratio exiting changes to stoichiometric until all stored NOx and oxygen are reduced, which occurs at time t2. Thus, according to the present invention, the stoichiometric air-fuel ratio measured downstream of NOx trap 72 during the interval from time t1 to time t2, is not equal to the air-fuel ratio upstream of NOx trap 72. After time t2, a rich exhaust air-fuel ratio is measured downstream of NOx trap 72 and this measurement can be used for air-fuel control or monitoring. At time t3, entering air-fuel is changed back to a lean air-fuel ratio. Again, air-fuel ratio exiting changes to stoichiometric until all the oxygen storage capacity of NOx trap 72 is saturated at time t4. Thus, according to the present invention, the stoichiometric air-fuel ratio measured downstream of NOx trap 72 during the interval from time t3 to time t4 is not equal to the air-fuel ratio upstream of NOx trap 72. After time t4, the entering air-fuel ratio can be measured by sensor 140 and thus can be used for control or monitoring.

Those skilled in the art will recognize in view of this disclosure that the above methods are applicable with any decontamination method. In a preferred embodiment, the decontamination method described in U.S. Pat. No. 5,758,493, which is hereby incorporated by reference, can be used.

Although several examples of embodiments which practice the invention have been described herein, there are numerous other examples which could also be described. The invention is therefore to be defined only in accordance with the following claims.

We claim:

1. A method for determining degradation of a sensor coupled downstream of an internal combustion engine, comprising:
   providing first and second output signals from said sensor indicative of first and second exhaust gas constituents, respectively, communicating with said sensor; and,
   determining degradation of said first output signal during predetermined engine air-fuel conditions, said degradation based at least on said second output signal.

2. The method of claim 1 wherein said predetermined engine air-fuel conditions include when a cylinder of said engine is operated at a stoichiometric air-fuel ratio.

3. The method of claim 1 wherein said first exhaust gas constituent is oxygen and said second exhaust gas constituent is NOx.

4. A method for determining degradation of a sensor coupled downstream of an internal combustion engine, comprising:
   providing first and second output signals from said sensor indicative of first and second exhaust gas constituents, respectively, communicating with said sensor; and,
   determining degradation of said first output signal based on an engine operating parameter and said second output signal.

5. The method of claim 4 wherein said step of determining degradation includes:
   determining an estimated value of said first output signal based on said engine operating parameter; and,
   comparing said first output signal to said estimated value of said first output signal to determine degradation of one of said first and second output signals.

6. The method of claim 4 wherein said engine operating parameter is at least one of a mass air flow, a fuel injection signal, and an air-fuel ratio measured upstream of said sensor.

7. The method of claim 4 wherein said first exhaust gas constituent is oxygen and said second exhaust gas constituent is NOx.

8. The method of claim 4 wherein said step of determining degradation is performed during predetermined engine conditions.

9. The method of claim 8 wherein said predetermined engine conditions include when a cylinder of said engine is operated at a stoichiometric air-fuel ratio.

10. An article of manufacture comprising:
   a sensor generating first and second output signals indicative of first and second exhaust gas constituents generated by an internal combustion engine having a downstream emission control device, said sensor located downstream of said downstream emission control device;
   a computer storage medium having a computer program encoded therein for determining degradation of said sensor, said computer storage medium comprising:
   code for storing values indicative of said first output signal and said second output signal; and
   code for determining degradation said first output signals based on an engine operating parameter and said second output signal.

11. The article of manufacture of claim 10 wherein said engine operating parameter is at least one of a mass air flow, a fuel injection signal, and an air/fuel ratio measured upstream of said sensor.

12. A method for monitoring a sensor coupled downstream of a downstream emission reducing device in an internal combustion engine, comprising:

generating first and second output signals from said sensor indicative of first and second exhaust gas constituents, respectively, from said downstream emission reducing device;

determining an estimated value of said first output signal based on at least one engine operating parameter and said second output signal; and, comparing said first output signal to said estimated value of said first output signal to determine degradation of said first output signal.

13. The method of claim 12 wherein said engine operating parameter is at least one of a mass air flow, a fuel injection signal, and an air-fuel ratio measured upstream of said sensor.

14. The method of claim 12 further including controlling a fuel injection amount injected into a cylinder of said engine responsive to one of said first and second output signals.

15. A method for monitoring a sensor coupled downstream of an emission reducing device in an internal combustion engine, comprising:

generating first and second output signals from said sensor indicative of first and second exhaust gas constituents, respectively, from said engine; and, determining an estimated value of said first output signal based on at least one engine operating parameter; and, comparing said first output signal to said estimated value of said first output signal to determine degradation of said first output signal; and, determining degradation of said second output signal based on said comparison of said first output signal to said estimated value of said first output signal.

16. A method for monitoring a sensor coupled downstream of an internal combustion engine, comprising:

generating first and second output signals from said sensor indicative of first and second exhaust gas constituents, respectively, from said engine;

determining an estimated value of said second output signal based on said first output signal and an engine operating parameter; and, comparing said second output signal to said estimated value of said second output signal to determine degradation of said second output signal.

17. A method for monitoring a sensor coupled downstream of an internal combustion engine, comprising:

generating first and second output signals from said sensor indicative of first and second exhaust gas constituents, respectively, from said engine;

calculating a degradation value based on said first output signal and an estimated value of said first output signal, said estimated value of said first output signal based at least on said second output signal; and, indicating said first output signal is degraded when said degradation value is greater than a threshold degradation value.

18. The method of claim 17 wherein said indicating step occurs when said degradation value is greater than said threshold degradation value for greater than a predetermined amount of time.

19. A method for monitoring a sensor coupled downstream of an internal combustion engine, comprising:

generating first and second output signals from said sensor indicative of first and second exhaust gas constituents, respectively, from said engine;

calculating a degradation value based on said first output signal and an estimated value of said first output signal;

indicating said first output signal is degraded when said degradation value is greater than a threshold degradation value; and, indicating said second output signal is degraded when said degradation value is greater than said threshold degradation value.

* * * * *

UNITED STATES PATENT AND TRADEMARK OFFICE
CERTIFICATE OF CORRECTION

| | |
|---|---|
| PATENT NO. | : 6,810,659 B1 |
| APPLICATION NO. | : 09/528220 |
| DATED | : November 2, 2004 |
| INVENTOR(S) | : David Bidner et al. |

It is certified that error appears in the above-identified patent and that said Letters Patent is hereby corrected as shown below:

In Column 1, line 29, delete "U.S. Pat. No. 5,942,199" and insert --U.S. Pat. No. 5,942,190-- therefor.

In Column 1, line 30-31, delete "U.S. Pat. No. 5,942,199" and insert --U.S. Pat. No. 5,942,190-- therefor.

Signed and Sealed this

Fifth Day of December, 2006

JON W. DUDAS
*Director of the United States Patent and Trademark Office*